May 19, 1964  J. P. JOHNSTON  3,133,502
CONTROL SYSTEM FOR MULTIPLE PUMP INSTALLATIONS
Filed Feb. 18, 1963  3 Sheets-Sheet 1
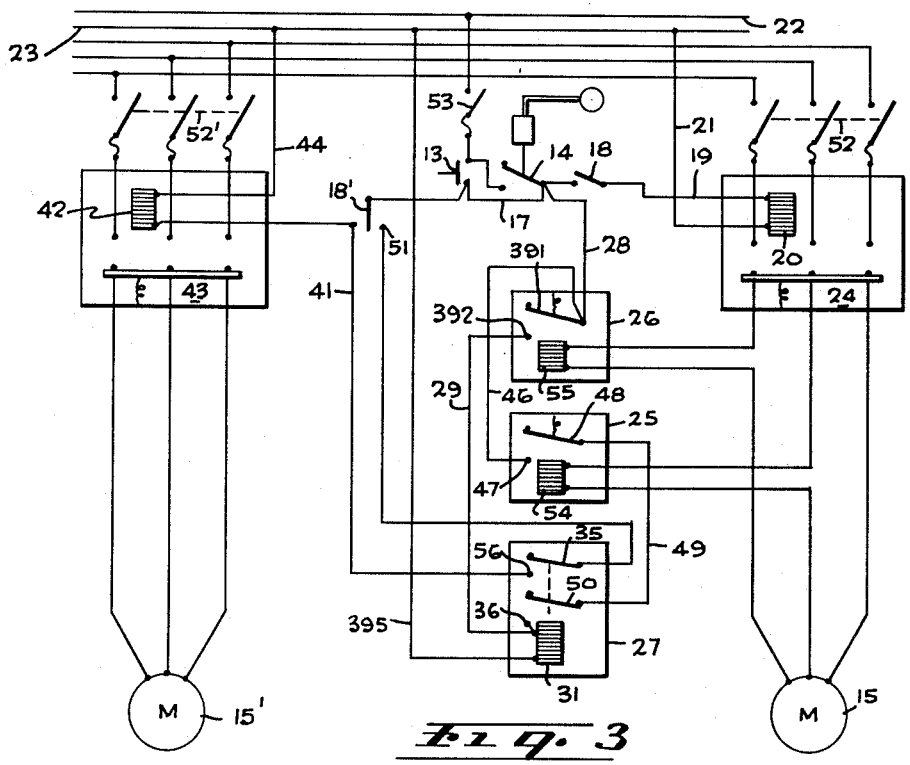
*Fig. 3*
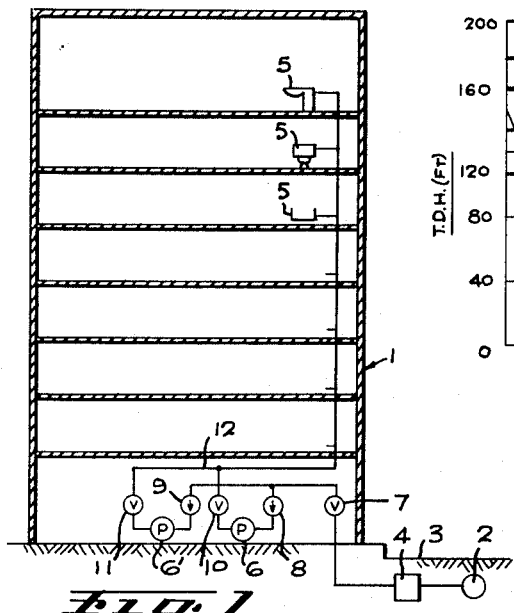
*Fig. 1*
*Fig. 2*
INVENTOR.
JOHN P. JOHNSTON
BY
LeRoy J. Leishman
AGENT

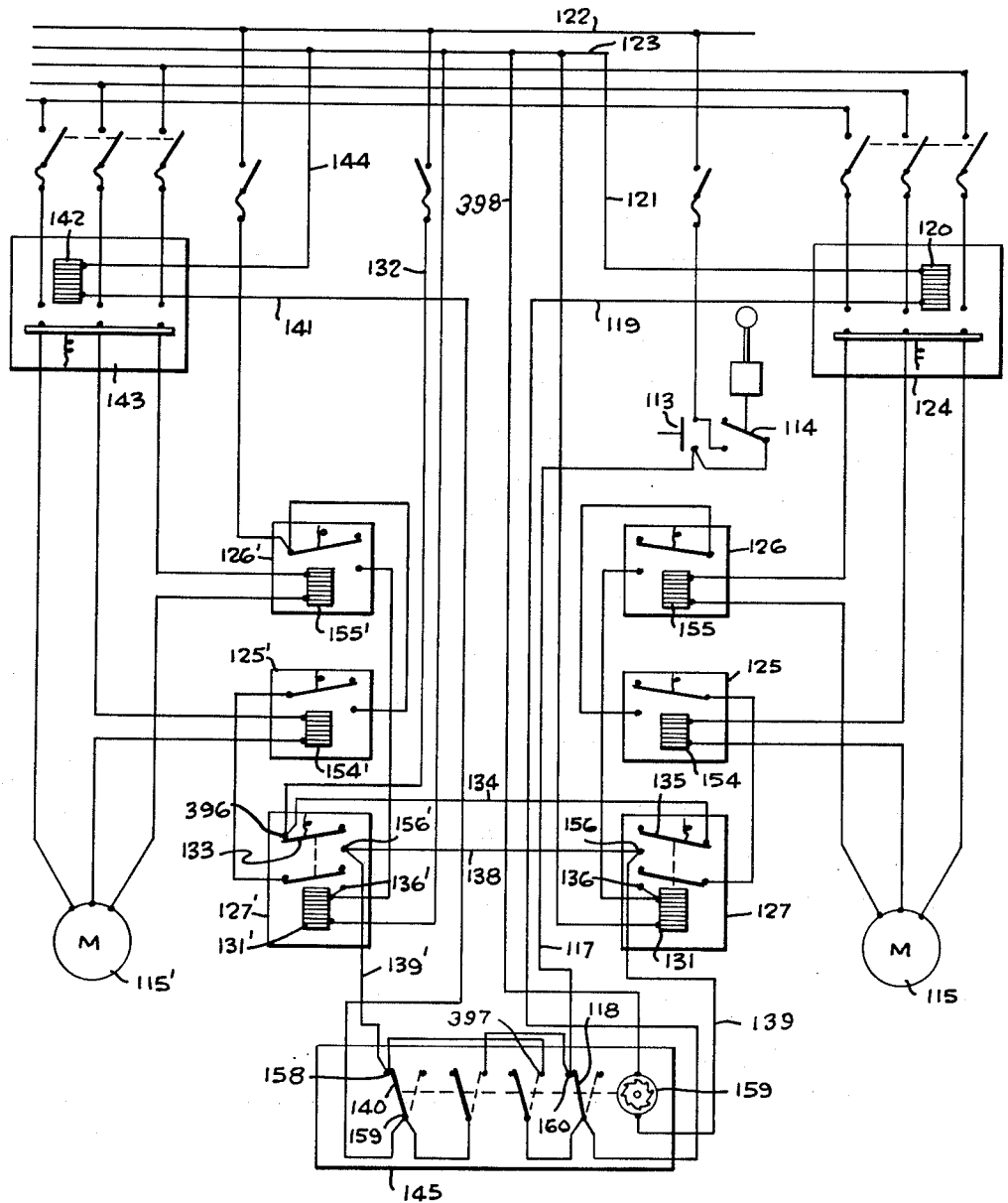

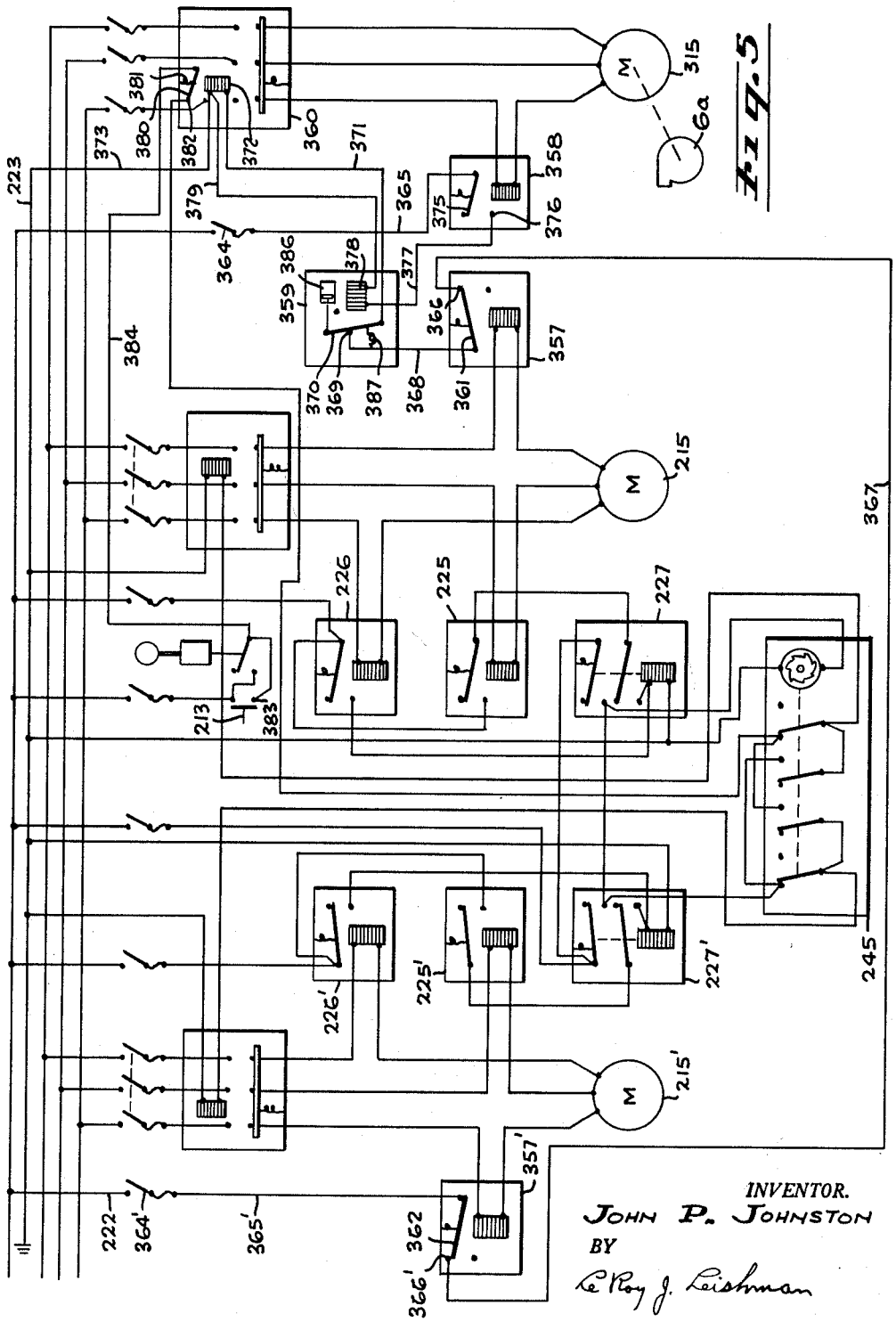

United States Patent Office 3,133,502
Patented May 19, 1964

3,133,502
CONTROL SYSTEMS FOR MULTIPLE PUMP
INSTALLATIONS
John P. Johnston, 118 Virginia St., Apt. 4,
El Segundo, Calif.
Filed Feb. 18, 1963, Ser. No. 259,305
4 Claims. (Cl. 103—11)

This invention pertains to control systems for multiple pump installations in which the pumps are driven by electric motors, and more particularly to systems in which additional pumping facilities are automatically added when the available volume of water in the building drops to a predetermined minimum value.

When supplying fluids through pumping systems where more than one pump is employed, as in supplying water for domestic use in buildings having several floors, it is desirable that the pumping system supply water at approximately constant pressure even though the volume requirements may vary from none to a maximum value roughly determined by the number of water-consuming devices in the building and the number of persons using such devices.

In prior practice, some pumping installations have included large, heavy gravity or pressurized water-storage tanks and a multiple pump arrangement controlled by the water level or water pressure. Other installations have incorporated systems having variable speed drives, such as fluid or magnetic drives, to vary the effective capacity of the pumps by means of their rotational speed, this speed in turn being controlled by the water level or pressure or the flow in the pipes.

Still other pumping installations have utilized systems to maintain approximately constant pressure by means of regulating valves, with or without flow orifices in the piping.

It is the general object of the present invention to provide a novel, simple and improved method of controlling the operation of the pumps in the multiple pump system, not dependent upon gravity or pressure storage tanks.

Another object of the present invention is to provide a system of the type described in which the required system pressure and volume capacities will remain approximately constant irrespective of variations in the flow from maximum to none at all.

An additional object of the invention is to provide a system of the type described in which one or more additional pumps will be brought into operation automatically when the load current of the initially-operating motor or motors passes a predetermined value.

A further object is to provide a system of the type described in which one of a pair of pumps is initially operative and in which the other pump is not only added to the system whenever the load current of the initially-operating motor passes a predetermined value but in which the initially operating motor and associated pump are disconnected from the system when the overall load current drops to a predetermined minimum, the second motor then continuing to operate until both motors are again required, each of the two motors being added in sequence whenever both pumps are required, such sequential operation providing substantially equal use and wear for the two motors and associated pumps.

Yet another object of my invention is to provide a system in which a third pump and motor of low capacity take over the operation of the system during periods in which water requirements in the building are low or in which a current failure makes it expedient to use an emergency pump that may be driven by other means than the usual electric power lines, such as an externally powered generator or electric power from any other source.

Still other features and objects of the present invention will become apparent to those skilled in the art upon consideration of the accompanying drawings and specification disclosing several exemplary embodiments, it being understood, however, that the description of these illustrative embodiments is not to be taken in a limiting sense, since the scope of the invention is best defined by the appended claims.

In the drawings:

FIGURE 1 is a diagrammatic representation of a multi-storied building illustrating a pair of pumps and associated equipment for supplying water to a plurality of water-consuming devices illustrated as being on different floors;

FIG. 2 is a graph including comparative pump performance curves, showing the typical pressure, volume, and horsepower characteristics encountered in the application of the invention;

FIG. 3 is a circuit diagram showing suitable relays and other components appropriately connected for an embodiment of my invention in which a second pump and associated motor supplement a continuously-operative motor and pump whenever the load current of the regular motor reaches a predetermined value;

FIG. 4 is a similar diagram of a system in which two pumps and their driving motors alternately supplement the other whenever the pumping requirements exceed a predetermined portion of the safe capacity of the pump then in operation; and FIG. 5 is a similar circuit diagram in which a third pump and associated motor, both of low capacity, automatically take over the operation of the system during periods when the flow requirements are low or in which there has been a power failure making it advisable to use emergency facilities.

Referring to the drawings, FIG. 1 shows a building 1 for which water is obtained from a public main 2 located below the surface of the street 3. In present practice, the water is piped into the building through a meter 4, and then, where the pressure is too low to serve the requirements of the water-consuming fixtures 5 in the building, to pumps 6 and 6' which are suitably connected to boost the pressure to the desired value. In customary practice, the water after passing through the meter 4 enroute to the aforementioned pumps, passes through a main valve 7 and then through valves 8 and 9 which are individual respectively to the pumps 6 and 6'; and still additional valves 10 and 11, individual to these pumps respectively, are usually interposed between such pumps and the piping that distributes the water throughout the building.

In a water system of the type with which we are concerned, it is desirable that the pressure be maintained approximately constant at the maximum value required to supply the water-consuming devices forming a part of the system. This is possible when the present invention is employed for the reason that the control devices that are a part of my system are not operated by variations in water pressure. This is accomplished by selecting a pump having a curve defined in the art as a "flat performance characteristic curve." A flat curve, in this sense, is one in which over a considerable range of flow, there is little, if any, variation in the pressure produced by the pump.

FIG. 2 of the drawings shows typical characteristic curves for centrifugal pumps operating at constant speed. Hypothetical values of pressure in feet of water, flow in gallons per minute, impeller diameter in inches and brake horsepower are assigned to these typical curves to illustrate the function of the curves. By inspection of these curves it will be seen that between the coordinates of zero and 500 gallons per minute each curve indicates for all practical purposes a constant pressure. Also, within this range of constant pressure, inspection of the brake horsepower asymptotes will show that for any specific pump, a specific relationship prevails between horsepower and flow, indicating a further relationship between electric current and flow.

FIGS. 3, 4 and 5 of the drawings show typical embodiments of my invention utilizing this relationship to control the operation of the electric motors forming a part of these illustrative embodiments. The circuitry shown in each case includes a three-phase supply to operate the motors and a single phase, or two-wire supply, to operate the various control devices. However, it will be understood that the particular control instrumentalities shown may be replaced by others where the use of alternative forms of electrical energy may be desirable.

My system in its various forms will perhaps most readily be understood by referring first to the system diagrammatically illustrated in FIG. 3 in which the motors 15 and 15' may be considered to be the motors for driving pumps 6 and 6' respectively, indicated in FIG. 1. In the system of FIG. 3, the motor 15 is the lead motor and the motor 15' is the companion standby motor for driving the standby pump which we may consider to be the pump 6', aforementioned. To start the system of FIG. 3, the switch 18 is first closed and the single-pole double-throw switch 18' is arranged to complete a circuit with contact 51. It will of course be understood that the main switches 52 and 52' will already have been closed to complete the three-wire circuits to switches 24 and 43, and that switch 53 will also be closed to complete the circuits to the 2-wire control components from the 2-wire supply lines 22 and 23. The system may now be started by closing the normally-open momentary contact switch 13, connected in parallel with a low pressure safety limit switch 14. This switch is an adjustable, pressure-operated switch normally closed at an elevated water pressure level and adjusted to open the contacts at a pre-selected lower pressure. When the momentary contact switch 13 is closed, a circuit will be completed through conductor 17, switch 18 and conductor 19 to the operating magnet 20 of the main switch 24, the other side of magnet 20 being permanently connected by conductor 21 to the main supply line 23. The energizing of magnet 20 closes the 3-wire circuits to motor 15, thus starting the pump 6, FIG. 1, and pumping water through pipes 12 to the various water-consuming devices 5 in the building 1.

In the embodiment under discussion, the coils 54 and 55 of relays 25 and 26 respectively are connected in series with the motor 15, each in a different line. Relays 25 and 26 are current-sensitive relays, adjustable for operating current and operating time and having individual automatic resets and inverse time limits. These relays may be set so that each one will independently close and independently open at predetermined load current values hereinafter to be explained. Relay 25 is initially set so that it will operate at a lower load current value than relay 26. Relay 25 will consequently operate first, with the result that a circuit will be completed from the afore-mentioned hot wire 17 through conductors 28 and 46, contact 47, pole 48 of relay 25, and thence through conductor 49 to pole 50 of relay 27, the function of which will be explained hereinafter. However, as relay 27 is not yet operative, the contacts of this relay will remain open. Relay 26 is pre-set to operate at a considerably higher load current value than relay 25, this value being such that it will not close until the load current passing through coil 55 is such that motor 15 will be operating at a capacity which is close to its maximum safe load. When this happens, the pole or armature 391 will be drawn to contact 392, with the result that a circuit will now be completed from the afore-mentioned hot wire 28 through pole 391, contact 392, and conductor 29 to the coil 31 of relay 27, the other side of this coil being connected by conductor 395 to the supply line 23. The operation of this relay brings the lower armature 50 into engagement with contact 36. Inasmuch as armature 50 was previously connected into the circuit by the operation of relay 25, the moving of pole 50 into engagement wtih contact 36 will maintain relay 27 in a closed condition even after relay 26 has opened. The reason for this will soon be apparent. Inasmuch as pole 35 is ganged to operate with the pole or armature 50, the armature 35 will maintain a circuit from this armature through contact 56 and conductor 41 as long as the coil 31 of relay 27 remains energized.

Conductor 41 is connected to coil 42 of the 3-pole relay 43 which completes the circuit to the standby motor 15'. The other side of this coil is connected by conductor 44 to supply line 23. This brings motor 6', FIG. 1, into operation, thus reducing the requirements on pump 6, which is driven by the lead motor 15 as hereinbefore explained. This will of course reduce the load current through a circuit of motor 15 and through the coils 55 and 54 of relays 26 and 25 respectively.

Although relays 25 and 26 are of the type that are adjustable to close at a preselected value of actuating current, the release current in both cases is a function of the current coil design and is usually in the range of 75 percent to 85 percent of the actuating current. Relay 26 is set so that it will be actuated at a current value, predetermined by the pumping system design requirements, that is considerably higher than that for which relay 25 is set. As a consequence, the load current passing through coil 55 of relay 26 will drop to its release value considerably ahead of coil 54 of relay 25. When the load current drops sufficiently to release relay 26, this will have no effect other than to remove the initial energizing current from conductor 29 that resulted in the closing of relay 27. However, this relay remains closed through contact 36, as hereinbefore explained, until the coil is de-energized at a later time through the removal of the current to armature 50 through conductor 49. Meanwhile, both motors 15 and 15' continue to operate to carry the load that has been placed upon the pumps. When the load upon the pumps drops to a point where the current load is below the minimum at which relay 25 will operate, this relay will of course then open and armature 48 will leave contact 47, thus breaking the circuit to contact 36. As a consequence, relay 27 will open and the actuating current will be removed from coil 42 of switch 43, thus stopping the standby motor 15'.

It is possible of course to replace relays 25 and 26 with a single relay, but the spread between the actuating current and the release current would then be too small for most practical application. I consequently prefer to use the 2-relay system just explained.

It will be clear that the standby motor 15' and its associated standby pump 6' will again operate when the load current through motor 15 and through coil 55 once more reach the pre-selected point at which the standby motor should once more assume its share of the load.

It will of course be understood that respect to the system just described and those diagrammatically illustrated in FIGS. 4 and 5, that suitable overload relays, valves and other conventional safety equipment will be included along with the necessary fuses, some of which are shown in the figures but not referred to in the description for the reason that they form no part of my invention per se.

The system illustrated by FIG. 4 is substantially the same as that diagrammatically shown in FIG. 3, excepting that in the embodiment of my invention illustrated in FIG. 4, the lead motor 115 and the standby motor 115' are alternately operative, the standby motor 115', once it is in operation, becoming the lead motor, and the original lead motor 115 becoming the standby motor, these motors continuing to assume the main load alternately for reasons hereinbefore mentioned. Throughout FIG. 4, certain of the components that are common to this figure and to FIG. 3 are designated by numerals in which the last two digits are the same as those for the corresponding parts in FIG. 3; in other words, the digit 1 has been placed in front of the digits used to designate the corresponding parts in FIG. 3. Accordingly, relays 125, 126 and 127 are the counterparts of relays 25, 26 and 27 in FIG. 3. The embodiment of my invention illustrated in FIG. 4 incorporates another set of relays designated respectively as 125′, 126′ and 127′. These relays serve the motor 115′ whenever it is acting as a lead motor in the same way that relays 125, 126 and 127 serve motor 115 when it is acting in the lead capacity.

Besides duplicating these three relays for each of the two motors, an additional relay 145 has been added to the circuit. The function of this relay, hereinafter explained in greater detail, is to cause whichever motor has been acting as the standby motor to become the lead motor after the low current relay for the opposite motor has been released so that its associated motor ceases to operate. This relay may be an appropriately connected stepping or notching relay or any other type of relay capable of being connected in such a manner that it will reverse or change the connections in a plurality of circuits with each successive operation.

In the embodiment illustrated in FIG. 3, the relay 27, by means of its pole 35, is directly connected to energize the coil 42 of the switch 43 that brings the standby motor into operation. In the FIG. 4 embodiment, however, the relay 127, corresponding to relay 27 in the circuit of FIG. 3, is not directly connected to the coil 142 of switch 143, corresponding respectively to coil 42 and switch 43 in FIG. 3, the reversing relay 145 being operatively interposed between them. Thus it will be seen that contact 156 which corresponds to contact 56 in FIG. 3, instead of being connected to a conductor leading to coil 142 (the counterpart of coil 42 in FIG. 3) is connected through conductors 138 and 139′ to terminals 153 and 397 of relay 145.

The corresponding contact 156′ of relay 127′ which is associated with the standby motor 115′, is also connected to these conductors.

Armatures 135 and 133 of relays 127 and 127′ respectively are interconneced by conductor 134, and this conductor is connected at the armature terminal 396 of relay 127′ to the conductor 132 which leads to the main 2-wire supply line 122. Let us assume now that relay 127 has been actuated as a result of a load current increase in motor 115 and coil 155, this actuation indicating that pump 6 driven by motor 115 is in need of assistance—all as described in connection with the corresponding components in FIG. 3. Current will now flow from "hot" wire 132 through conductor 134, armature 135, contact 156 and conductors 138 and 139′ to contacts 153 and 397 of reversing relay 145. With the ganged poles of this relay in the operative positions shown in full lines in FIG. 4, the current from conductor 139′ will flow through contact 158, pole 140, terminal 159 and thence through conductor 141 to the coil 142 of the 3-phase relay 143. The other side of this coil is connected by conductor 144 to the main supply line 123. This connects the standby motor 115′ into the circuit, as will be evident from the explanation regarding the operation of relay 43 in the embodiment illustrated in FIG. 3.

The aforementioned operation of relay 127 also completed a circuit through conductor 139 to the reversing mechanism 159 of the reversing or repeating relay 145. This throws the gang of armature poles from the full line positions shown in FIG. 4 to their dotted line positions, and breaks the connections between pole 118 and contact 160 connected to the hot wire 117. As a result, no current now flows from contact 160 through pole 118 and conductor 119 to coil 120 of the 3-phase relay 124. The de-energizing of this relay of course takes motor 115 out of the circuit, and motor 115′ continues to operate to drive pump 6′ which in the previously described portion of the cycle had been the standby motor. The coils 154′ and 155′ are of course connected into the circuits of motor 115′ just as their counterparts associated with motor 115 were connected into the circuits of that motor. As a consequence, relays 125′, 126′ and 127′ perform with respect to motor 115′ in precisely the same manner that their counterparts associated with motoh 15 in the embodiment of FIG. 3 performed with respect to motor 115. This means that when motor 115′ reaches the critical load point, relay 126′ will operate and energize coil 131′ of relay 127′. This closes the circuit through armature 133, contact 156′, conductors 138 and 139 to the reversing mechanism 159 of the reversing relay 145, the other side of which is connected by conductor 398 to the main current supply line 123. The poles of relay 145 will then return from the broken line positions shown in the figure to their full line positions, thus once more bringing motor 115 into operation as a result of the closing of the 3-phase relay 124 in response to the energizing of coil 120 through conductor 119 connected to pole 118 of the reversing relay. The cycle just described will of course repeat itself each time the load current in the then operating motor drops to the critical low point that causes relay 125 or 125′ to be released.

The embodiment of my invention illustrated in FIG. 5 makes provisions for relieving the main pumps and motors during periods when the water requirements in the building are extremely low, as in the early morning hours after midnight. This is accomplished by adding an auxiliary motor 315 and pump 6a with appropriate controls whereby it may be turned on independently of the regular motors 215 and 215′, as well as controls interconnected with previously described relay system for breaking the circuits to the main motors and connecting the auxiliary motor 315 into the circuits instead. For these purposes, I add relays 357 and 357′, whose coils are connected in series with one of the supply lines of motors 215 and 215′, respectively. I also add relays 358, 359 and 360, whose functions will become apparent as the description proceeds.

Relays 357 and 357′ are set to operate at a much lower load current than the low-current-responsive relays 225 and 225′, which of course serve the same purpose as their correspondingly numbered counterparts in the system of FIG. 4. Relays 357 and 357′ are set so that they will release only when the current to their associated motors 215 or 215′ drop to a value far lower than that required for normal use. When the motors 215 and 215′ are alternately operable in their normal manner, these normally closed relays are open—that is, their connections are such that no current flows through their armatures or poles 361 or 362. However, when the current drawn by motor 215 or 215′ is so low that their associated relays 357 and 357′ release their respective armatures, these armatures then respectively engage contacts 366 and 366′.

When the auxiliary motor 315 and any of its associated relays are operative, the switches 364 and 364′ will of course be closed, thus connecting conductors 365 and 365′ to wire 222 of the main single-phase supply source. When so connected, current will flow from conductor 365′ through pole 362 and contact 366′ of relay 357′ and thence through conductor 367 and contact 366 and pole 361 of relay 357 and then through conductor 368 to contact 369 and pole 370 of the safety relay 359. From there the current will flow through conductor 371 to coil 372 of the 3-phase relay 360. Inasmuch as the other side of coil 372 is connected to conductor 373 leading to the wire 223 of the single-phase power source, relay 360 will now operate to energize the auxiliary motor 315.

It will be evident from the circuits just described that either relay 357 or 357′ will be operative and their contacts closed whenever either of the motors 215 or 215′ is drawing any appreciable load current, and that both of the relay 357 and 357′ must release in order to close the circuits that energize the auxiliary motor 315. Likewise, whenever either of these two relays operate, its armature will move away from its associated contact, and since the armatures of these two relays are connected in series, the breaking of the circuit by either one of them will result in the deenergizing of coil 372 of the relay 360 that handles the 3-phase current for the auxiliary motor 315.

Relay 358 performs the same function with respect to the auxiliary motor 315 that relays 226 and 226' perform with respect to their associated motors 215 and 215'— that is, to operate whenever the load current through the associated motor rises to a level that indicates that it is approaching its maximum capacity. Consequently, the operation of relay 358 will close the circuit from "hot" wire 365 through armature 375, contact 376, conductor 377, coil 378 of relay 359, and thence through conductors 379 and 373 back to the power source 223. The resultant energizing of coil 378 will cause armature 370 to leave contact 369, thus breaking the circuit to conductor 371 to deenergize coil 372 and permit relay 360 to open, thus stopping its associated auxiliary motor 315.

Relay 360 has another armature 380 so associated therewith that whenever this coil becomes energized to start the auxiliary motor 315, the main circuit will be broken to the control relays for motors 215 and 215' so that neither of them can operate while the auxiliary motor 315 is running. However, as soon as the deenergizing of coil 372 releases its two armatures, its upper armature 380 will again be urged by its loading spring 381 to its normally closed position in which the armature engages contact 382 completing the normal circuit from contact 383 of the manually operable switch 213 through conductors 384, pole 380, contact 382 and conductor 217 which corresponds to conductor 117 of the previously described embodiment illustrated in FIG. 4.

Relay 359 is a time delay relay incorporating a dash pot arrangement 386 which prevents armature 370 from closing against contact 369 under action of the loading spring 387 until sufficient time has elapsed to permit the current values to become stabilized.

If the auxiliary motor 315 is intended to operate when there is a failure of the power from the normal power source, those skilled in the art will have no difficulty in arranging a relay that will connect the auxiliary motor 315 to an independent power source whenever the current to motors 215 and 215' drops to zero. Various other modifications will readily suggest themselves to those skilled in the art, and it will be understood that any of the elements of my claimed combination may be replaced by other components performing the same function, and that various of the elements may be reversed or re-arranged and added to, all without departing from the broad spirit of my invention as succinctly set forth in the appended claims.

The inventor claims:

1. In a piping installation utilizing a plurality of pumps for maintaining the required liquid pressure and flow, a system comprising: a first pump connected between the main water supply line and the pipes that furnish water to the various outlets in the building; a second pump also operatively interposed between said line and said outlets; a first electric motor for driving said first pump; a second electric motor for driving said second pump; and current sensitive means comprising at least one relay having (a) at least one magnetic operating coil connected in series with said first motor, and (b) contacts that close when the current in said coil reaches a pre-selected high value and open when said current drops to a pre-selected low value, said means acting to energize said second motor in response to the closing of said contacts and to deenergize said second motor upon the opening of said contacts.

2. In a piping installation utilizing a plurality of pumps for maintaining the required liquid pressure and flow, a system comprising: a first pump connected between the main water supply line and the pipes that furnish water to the various outlets in the building; a second pump also operatively interposed between said line and said outlets; a first electric motor for driving said first pump; a second electric motor for driving said second pump; and current sensitive means comprising first and second relays each having a magnetic operating coil connected in series with said first motor, said first relay having a first set of contacts that close when the current through its coil reaches a first pre-selected value and open when said current drops to a second pre-selected value, and said second relay having a second set of contacts that close when the current through its coil reaches a third pre-selected value that is higher than said first pre-selected value and that close when the current through the coil of said second relay drops to a fourth pre-selected value that is lower than said third pre-selected value, but higher than said first pre-selected value, said means acting to energize said second motor upon the closing of said second set of contacts and to remove the power from said second motor upon the opening of said first set of contacts.

3. In a piping installation utilizing a plurality of pumps for maintaining the required liquid pressure and flow, a system comprising: a first pump connected between the main water supply line and the pipes that furnish water to the various outlets in the building; a second pump also operatively interposed between said line and said outlets; a first electric motor for driving said first pump; a second electric motor for driving said second pump; current sensitive means comprising at least one relay having (a) at least one magnetic operating coil connected in series with said first motor, and (b) contacts that close when the current in said coil reaches a pre-selected high value and open when said current drops to a pre-selected low value said means acting to energize said second motor in response to the closing of said contacts; reversing means responsive to the closing of said contacts for opening the power circuits to said first motor; and current-sensitive instrumentalities comprising at least one relay having (a) at least one magnetic actuating coil connected in series with said second motor, and (b) contacts that close when the current in said actuating coil reaches a pre-seleced high value and open when the current in said actuating coil drops to a pre-selected low value, said instrumentalities acting to remove the power from said second motor and to energize said first motor in response to the closing of said last mentioned contacts, and said current sensitive means and said current sensitive instrumentalities acting together to alternately energize and deenergize said motors when the current through the coil of the relay associated with the then operating motor drops to the low current value at which its contacts open.

4. In a piping installation utilizing a plurality of pumps for maintaining the required liquid pressure and flow, a system comprising: a first pump connected between the main water supply line and the pipes that furnish water to the various outlets in the building; a second pump also operatively interposed between said line and said outlets; a first electric motor for driving said first pump; a second electric motor for driving said second pump; current sensitive means comprising at least one relay having (a) at least one magnetic operating coil connected in series with said first motor, and (b) contacts that close when the current in said coil reaches a pre-selected high value and open when said current drops to a pre-selected low value, said means acting to energize said second motor in response to the closing of said contacts; reversing means responsive to the closing of said contacts for opening the power circuits to said first motor; current-sensitive instrumentalities comprising at least one relay having (a) at least one magnetic actuating coil connected in series with said second motor, and (b) contacts that close when the current in said actuating coil reaches a preselected high value and open when the current in said actuating coil drops to a pre-selected low value, said instrumentalities acting to remove the power from said second motor and to energize said first motor in response to the closing of said last mentioned contacts; a third pump of lower capacity than said first or second pump; a third motor of lower capacity than said first or second motor; and electrical apparatus for energizing said third motor and de-energizing said first and second motors when the current in said operating coil and the current in said actuating coil both drop to the low current values at which their associated contacts open, said apparatus also acting to de-energize said third motor and energize said first motor upon the closing of the contacts associated with said operating coil.

References Cited in the file of this patent

UNITED STATES PATENTS

| | | |
|---|---|---|
| 1,750,161 | Deans | Mar. 11, 1930 |
| 2,774,929 | Schaefer | Dec. 18, 1956 |
| 2,972,709 | Chabala | Feb. 21, 1961 |